May 13, 1924.
A. MARK
BICYCLE SEAT
Filed Aug. 21, 1923
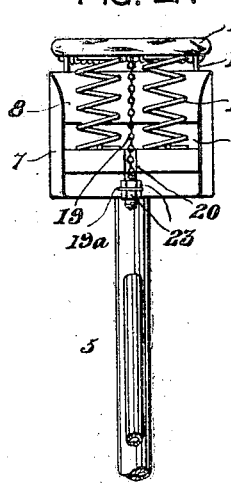
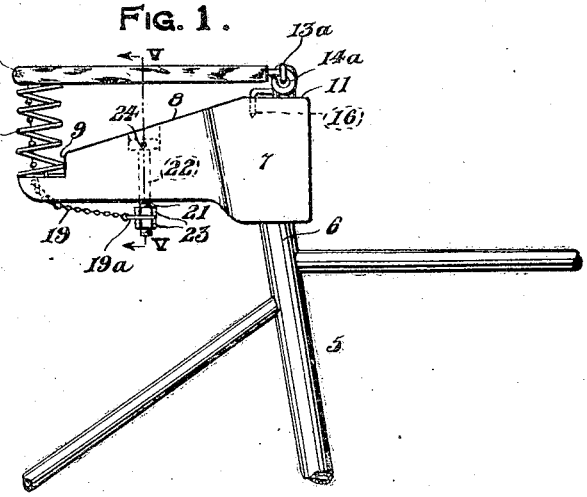
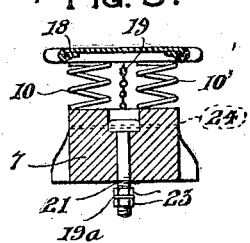
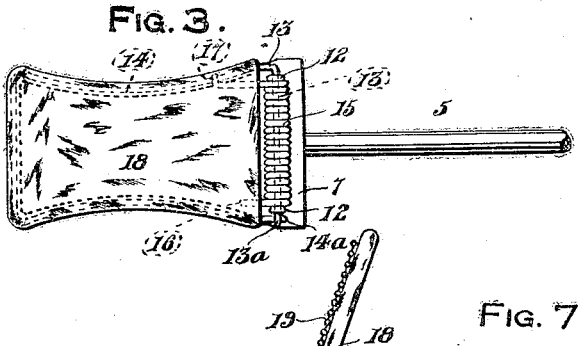
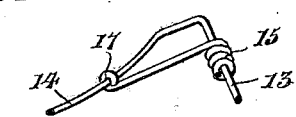
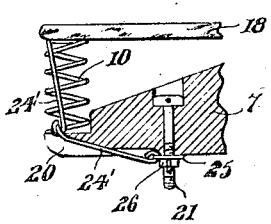
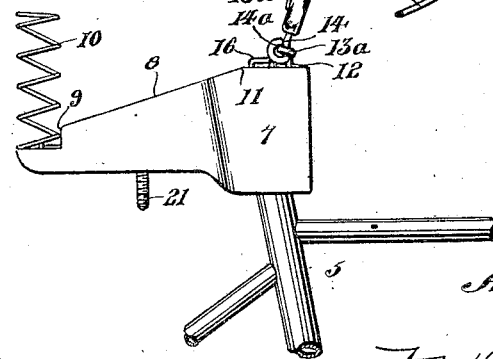
Inventor
A. Mark
By F. A. Bryant
Attorney Patented May 13, 1924.

1,494,178

UNITED STATES PATENT OFFICE.

ANDY MARK, OF EAST YOUNGSTOWN, OHIO.

BICYCLE SEAT.

Application filed August 21, 1923. Serial No. 658,561.

*To all whom it may concern:*

Be it known that I, ANDY MARK, a citizen of Rumania, residing at East Youngstown, in the county of Mahoning and State of Ohio, have invented certain new and useful Improvements in Bicycle Seats, of which the following is a specification.

This invention relates to new and useful improvements in bicycle seat structures.

An important object of the invention is to provide a bicycle seat which possesses a desired degree of resiliency for providing comfort for the rider.

A further object of the invention is the provision of means for adjusting the resiliency of the seat for adapting the latter to riders of different weights.

Other objects and advantages of the invention will be apparent during the course of the following description.

In the accompanying drawing, forming a part of this specification and in which like numerals are employed to designate like parts throughout the same, Figure 1 is a fragmentary side elevational view of a bicycle frame with a side elevational view of the seat embodying this invention properly associated therewith, Figure 2 is a rear elevational view of the structure shown in Figure 1, Figure 3 is a top plan view of the structure shown in Figures 1 and 2, Figure 4 is a side elevational view of the fragmentary portion of a bicycle frame and the seat construction with the seat portion in an inoperative position for the purpose of properly illustrating the resilient nature of the support for said seat, Figure 5 is a vertical sectional view taken upon line V—V of Figure 1, Figure 6 is a fragmentary sectional view, partly in elevation, of a modified form of construction, and Figure 7 is a fragmentary portion of the seat frame and one of the spring elements associated therewith.

In the drawing, wherein for the purpose of illustration is shown a preferred embodiment of this invention, the numeral 5 designates the bicycle frame in its entirety. The seat post 6 is properly connected to a seat supporting base or block 7 which is provided with a portion of its upper surface inclined downwardly as at 8, while the extreme rear edge of the base or block 7 is provided with a reentrant portion 9 which is employed for receiving the lower ends of the vertically extending spiral spring 10 and for having said ends secured thereto. The remaining top surface of the base or block 7 is intended to be substantially flat, as at 11 for receiving the spaced staples 12 which pivotally engage the transversely extending end portion 13 of the seat frame 14. This seat frame is intended to be constructed from a suitable strand of semi-resilient wire which is provided with an eye-shaped portion 13ª at one end of the transverse extending forward portion 13 and with a second eye portion 14ª which is formed on the end of one of the longitudinally extending side portions of the frame 14. These two eye portions 13ª and 14ª are intended to be connected, as best illustrated in Figures 1, 3 and 4 for forming the entire frame 14. The transversely extending frame portion 13 is provided with a tightly coiled spring 15 having one of its ends, as at 16 embedded in the base block 7 and having its opposite end extending along one of the longitudinal side portions of the seat frame and connected thereto, as at 17 in Figure 7. This seat frame 14 is intended to be covered by the leather or fabric 18 and may be suitably padded for preventing the user from feeling the wire frame portion 14 through the said covering. The rear end of this seat construction is intended to be supported by engaging the upper ends of the spring elements 10 and to be retained thereagainst by the flexible chain 19 which extends downwardly between the said spaced springs 10 through a slot 20 formed in the base or block 7 and to be connected at its free end to the bolt 21 which is positioned within a suitable bolt hole 22 provided in said base or block 7. For the purpose of adjusting the position of the rear end of the seat structure and consequently adjusting the tension of the springs 10 and 14, the end of the chain 19 is provided with a ring 19ª which is adapted for engaging the bolt 21 between the lock nuts 23 which may be adjusted upwardly or downwardly upon the said bolt for increasing or decreasing the tension of said spring. A transversely extending pin 24 is embedded in the base or block 7 and passes through the head of the bolt 21 for preventing upward movement of the latter, due to the pull upon the chain 19.

In the modified form shown in Figure 6, the rear end of the seat structure is retained in engagement with the rear springs 10 by means of the links 24' which are provided with a ring 25 adapted for engaging the bolt 21 and to be secured thereto in a fixed position by means of the thumb nut 26. It is to be understood, however, that the form shown in Figure 6 may employ a desired number of washers between the lower face of the base or block 7 and the ring 25 for increasing or decreasing the tension of the spring element.

It is to be understood that the forms of this invention herewith shown and described are to be taken as the preferred example of the same, and that various changes in the shape, size, and arrangement of parts may be resorted to without departing from the spirit of the invention or the scope of the structure in the subjoined claims.

Having thus described the invention, I claim:

1. In a bicycle seat, a base of solid block formation, a wire seat frame pivotally secured to said base, a cover for said frame, spring elements connected to said base for supporting said seat, and non-resilient means connecting said base and seat for varying the normal elevation of the latter for changing the tension of said springs.

2. In a bicycle seat, a base of solid block formation, a wire seat frame pivotally secured at its front edge to said base, a cover for said frame, spring supports for the rear portion of said frame, and non-resilient means connecting said base and seat for varying the normal elevation of the rear portion of the latter for varying the tension of the supporting spring.

3. In a bicycle seat, a base of solid block formation, a wire seat frame pivotally secured at its front edge to said base, a covering for said frame, spring supports for the rear portion of said frame, a flexible element connected to the rear portion of said frame, and an adjusting element carried by said base connected to said flexible element for varying the elevation of the rear portion of said seat frame and thereby varying the tension of the supporting frame.

4. In a bicycle seat, a base, a seat frame pivotally secured to said base at its front edge, a covering for said frame, a transversely extending coil spring connected to said base and frame for normally tending to elevate the rear end of said frame, spring supports for the rear portion of said frame, and means for varying the elevation of the rear portion of said frame for varying the tension of the spring element.

In testimony whereof I affix my signature.

ANDY MARK.